US010134157B2

(12) United States Patent
Hagiwara

(10) Patent No.: US 10,134,157 B2
(45) Date of Patent: Nov. 20, 2018

(54) IMAGE GENERATING APPARATUS, RADIATION TOMOGRAPHY IMAGING APPARATUS, AND IMAGE GENERATING METHOD AND PROGRAM

(71) Applicant: General Electric Company, Schenectady, NY (US)

(72) Inventor: Akira Hagiwara, Tokyo (JP)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 61 days.

(21) Appl. No.: 15/121,332

(22) PCT Filed: Dec. 15, 2014

(86) PCT No.: PCT/US2014/070252
§ 371 (c)(1),
(2) Date: Aug. 24, 2016

(87) PCT Pub. No.: WO2015/130388
PCT Pub. Date: Sep. 3, 2015

(65) Prior Publication Data
US 2017/0084059 A1 Mar. 23, 2017

(30) Foreign Application Priority Data
Feb. 27, 2014 (JP) ................................. 2014-036930

(51) Int. Cl.
*G06T 11/00* (2006.01)
(52) U.S. Cl.
CPC .. *G06T 11/008* (2013.01); *G06T 2207/10081* (2013.01)
(58) Field of Classification Search
CPC ......... G06T 11/006; G06T 2207/10081; G06T 11/008; G06T 11/005; G06T 2207/30064;
(Continued)

(56) References Cited

U.S. PATENT DOCUMENTS 5,454,019 A * 9/1995 Migita .................. A61B 6/032
378/15
6,421,411 B1 * 7/2002 Hsieh .................... A61B 6/032
378/19

(Continued)

FOREIGN PATENT DOCUMENTS

EP  2014232 A2 * 1/2009 ........... G06T 11/008
JP  4350738 B2  10/2009

OTHER PUBLICATIONS

PCT Search Report and Written Opinion issued in connection with Corresponding PCT Application No. PCT/US2014/070252 dated Apr. 1, 2015.

(Continued)

*Primary Examiner* — Jingge Wu
(74) *Attorney, Agent, or Firm* — Fletcher Yoder, P.C.

(57) ABSTRACT

[Problem] To further reduce artifacts of a reconstructed image. [Solution] Provided is an image generating apparatus which includes: a determining unit configured to determine projection data collected by scan of an imaging object using a radiation source and a detector; a first setting unit configured to set a plurality of first reconstruction planes corresponding to images to be supplied to an operator, in the body axis direction of the imaging object; a second setting unit configured to set one or more second reconstruction planes corresponding to one or more images not to be supplied to the operator and different from the first reconstruction planes, in the body axis direction; a reconstruction unit configured to reconstruct a plurality of images corresponding to the plural first reconstruction planes and images corresponding to the one or more second reconstruction planes, based on the projection data; and a processing unit configured to perform an artifact reduction process on an image corresponding to a given first reconstruction plane using a plurality of images corresponding to a plurality of (Continued)

reconstruction planes including the plural first reconstruction planes and at least one of the one or more second reconstruction planes.

17 Claims, 14 Drawing Sheets

(58) Field of Classification Search
CPC .. G06T 2211/416; G06T 5/002; A61B 6/5258
See application file for complete search history.

(56) References Cited

U.S. PATENT DOCUMENTS

| | | | | |
|---|---|---|---|---|
| 6,452,996 B1* | 9/2002 | Hsieh | ................. | A61B 6/032 378/15 |
| 2001/0010464 A1* | 8/2001 | Takamori | ........... | G01R 33/3854 324/304 |
| 2002/0006216 A1* | 1/2002 | Armato, III | ......... | G06T 7/0012 382/131 |
| 2005/0135549 A1* | 6/2005 | Hagiwara | ............ | G06T 11/006 378/4 |
| 2005/0135664 A1* | 6/2005 | Kaufhold | ............. | G06T 11/006 382/131 |
| 2005/0147320 A1* | 7/2005 | Hsieh | ................. | G06K 9/40 382/275 |
| 2007/0121779 A1* | 5/2007 | Nishide | ................ | G06T 11/005 378/4 |
| 2007/0172104 A1* | 7/2007 | Nishide | ................ | A61B 6/032 382/131 |
| 2008/0002806 A1* | 1/2008 | Nishide | ................ | A61B 6/032 378/4 |
| 2008/0031407 A1* | 2/2008 | Satta | ................. | A61B 6/032 378/15 |
| 2008/0118022 A1* | 5/2008 | Hagiwara | ............. | A61B 6/032 378/4 |
| 2008/0130823 A1* | 6/2008 | Hagiwara | ............ | G06T 11/008 378/4 |
| 2009/0168952 A1* | 7/2009 | Mori | ................. | A61B 6/032 378/15 |
| 2010/0183214 A1* | 7/2010 | McCollough | .......... | A61B 6/032 382/131 |
| 2012/0170822 A1* | 7/2012 | Litvin | .................. | G06T 11/006 382/131 |
| 2014/0268105 A1* | 9/2014 | Bills | ................... | G03H 1/0443 356/51 |
| 2015/0036788 A1* | 2/2015 | Baba | ................... | A61B 6/027 378/4 |
| 2015/0297166 A1* | 10/2015 | Goto | .................. | G09B 23/286 378/15 |
| 2016/0120493 A1* | 5/2016 | Maeda | .................. | A61B 6/032 382/131 |
| 2016/0163045 A1* | 6/2016 | Penney | ................ | G06T 11/006 382/131 |

OTHER PUBLICATIONS

International Preliminary Report issued in connection with Corresponding PCT Application No. PCT/US2014/070252 dated Sep. 9, 2016.

Unofficial English Translation of Japanese Office Action issued in connection with corresponding JP Application No. 2014-036930 dated May 16, 2017.

* cited by examiner

RS: IMAGING RANGE
SL: SLICE
s1: FIRST RECONSTRUCTION PLANE
s2: SECOND RECONSTRUCTION PLANE
Δz: SLICE THICKNESS

RS: IMAGING RANGE
Gc: PROCESSING IMAGE
s1: FIRST RECONSTRUCTION PLANE
s2: SECOND RECONSTRUCTION PLANE
$\Delta z$: SLICE THICKNESS
Ga: PROCESSING OBJECT IMAGE
Rc: ANALYSIS RANGE

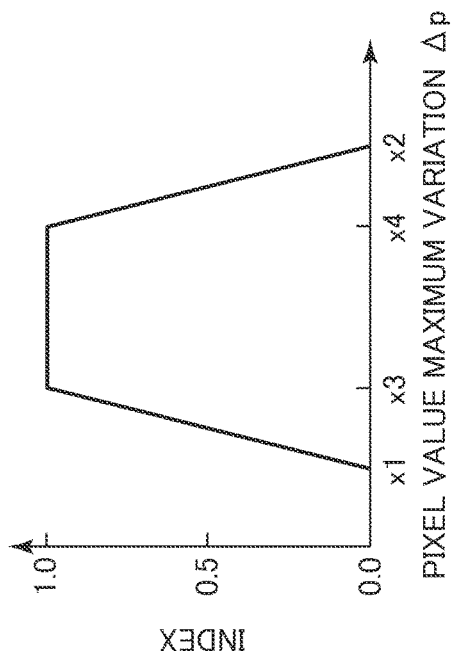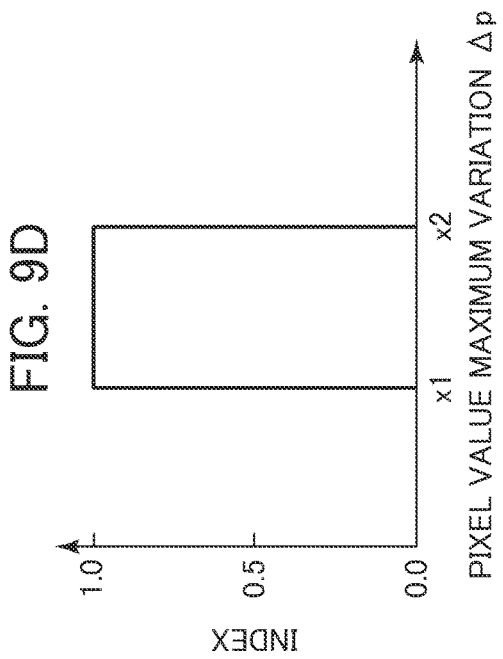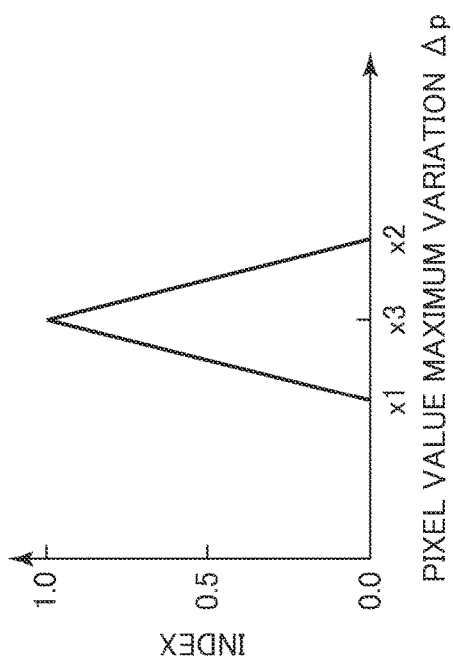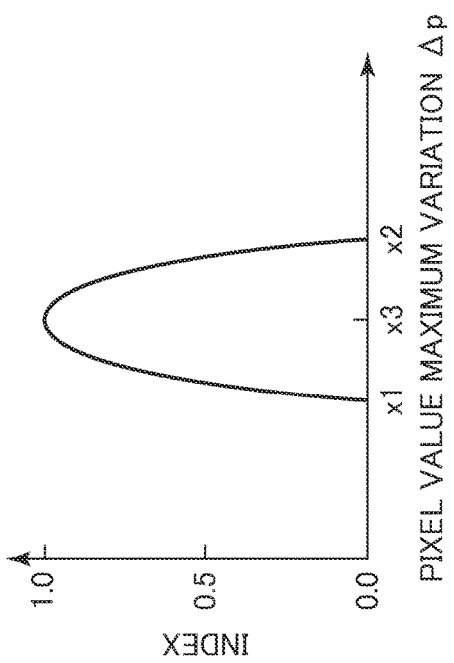

RS: IMAGING RANGE
Gc: PROCESSING IMAGE
s1: FIRST RECONSTRUCTION PLANE
s2: SECOND RECONSTRUCTION PLANE
Δz: SLICE THICKNESS
Ga: PROCESSING OBJECT IMAGE
Rc: ANALYSIS RANGE

RS: IMAGING RANGE
Gc: PROCESSING IMAGE
s1: FIRST RECONSTRUCTION PLANE
s2: SECOND RECONSTRUCTION PLANE
Δz: SLICE THICKNESS
Ga: PROCESSING OBJECT IMAGE
Rc: ANALYSIS RANGE

IMAGE GENERATING APPARATUS, RADIATION TOMOGRAPHY IMAGING APPARATUS, AND IMAGE GENERATING METHOD AND PROGRAM

TECHNICAL FIELD

The present invention relates to technology for reducing artifacts of an image reconstructed based on projection data collected by scan using a radiation tomography imaging apparatus.

BACKGROUND ART

Various methods for reducing artifacts of an image reconstructed based on projection data collected by scan using a radiation tomography imaging apparatus have been proposed. As one of such methods, a method has been proposed in which a plurality of images lined up in the body axis direction of an imaging object, which are planned to be supplied to an operator, are reconstructed and an imaging process such as a filtering process is performed on the reconstructed images in the body axis direction (for example, see the abstracts of PTL1 and PTL2, etc.).

According to this method, in the reconstructed images, it is possible to retain images depicting the structure of the imaging object in which variation in the body axis direction is relatively gradual, and reduce artifacts in which variation in the body axis direction is relatively sharp.

CITATION LIST

Patent Literature

PTL 1: Japanese Patent No. 4350738
PTL 2: Japanese Patent No. 4414420

SUMMARY OF INVENTION

Technical Problem

However, there are cases that artifacts cannot be reduced sufficiently even by an image processing method such as a filtering process in the body axis direction as mentioned above. Particularly in an image reconstructed based on projection data obtained by helical scan, a windmill artifact attributable to the helical scan is likely to appear and the effect of the method to reduce it is limited.

Because of the above circumstances, technology to further reduce artifacts of an image reconstructed based on projection data obtained by a radiation tomography imaging apparatus is hoped for.

Solution to Problem

According to a first aspect of the invention,
there is provided an image generating apparatus which includes:

a determining unit configured to determine projection data collected by scan of an imaging object using a radiation source and a detector;

a first setting unit configured to set a plurality of first reconstruction planes in a body axis direction of the imaging object;

a second setting unit configured to set one or more second reconstruction planes different from the first reconstruction planes in the body axis direction of the imaging object;

a reconstruction unit configured to reconstruct a plurality of images corresponding to the first reconstruction planes and to be supplied to an operator and one or more images corresponding to the one or more second reconstruction planes and not to be supplied to the operator, based on the projection data; and a processing unit configured to perform an artifact reduction process on an image corresponding to a given first reconstruction plane using a plurality of images corresponding to a plurality of reconstruction planes including the plural first reconstruction planes and at least one of the one or more second reconstruction planes.

According to a second aspect of the invention,
there is provided the image generating apparatus according to the first aspect, in which the second setting unit sets one or more second reconstruction planes in a given range including the given first reconstruction plane and one or more other first reconstruction planes near the given first reconstruction plane; and the processing unit performs the artifact reduction process using a plurality of images corresponding to the plural reconstruction planes included in the given range.

According to a third aspect of the invention,
there is provided the image generating apparatus according to the second aspect, in which the given range is a range which includes the given first reconstruction plane and two first reconstruction planes on both adjacent sides thereof; and the second setting unit sets one or more second reconstruction planes between the given first reconstruction plane and each of the two first reconstruction planes on the both adjacent sides thereof.

According to a fourth aspect of the invention,
there is provided the image generating apparatus according to any one of the first to third aspects, in which the second setting unit sets one second reconstruction plane at every middle position between two first reconstruction planes adjacent to each other.

According to a fifth aspect of the invention,
there is provided the image generating apparatus according to any one of the first to fourth aspects, in which the first setting unit sets the plural first reconstruction planes based on conditions of an imaging range and slice thickness which are specified by the operator.

According to a sixth aspect of the invention,
there is provided the image generating apparatus according to any one of the first to fifth aspects, in which distance between the given first reconstruction plane and a second reconstruction plane nearest to the given first reconstruction plane is smaller than minimum slice thickness that the operator can set.

According to a seventh aspect of the invention,
there is provided the image generating apparatus according to any one of the first to sixth aspects, in which the processing unit performs the artifact reduction process on a basis of pixels constituting an image corresponding to the given first reconstruction plane.

According to an eighth aspect of the invention,
there is provided the image generating apparatus according to the seventh aspect, in which the processing unit calculates probability that a given pixel in the image corresponding to the given first reconstruction plane represents an artifact, using images corresponding to first and second reconstruction planes included in the given range, and controls a parameter for the artifact reduction process on the pixel according to the probability.

According to a ninth aspect of the invention, there is provided the image generating apparatus according to any one of the first to eighth aspects, in which the reconstruction unit reconstructs the images by a three-dimensional back projection process on the projection data.

According to a tenth aspect of the invention, there is provided the image generating apparatus according to any one of the first to ninth aspects, in which the artifact reduction process includes a filtering process.

According to an eleventh aspect of the invention, there is provided the image generating apparatus according to the tenth aspect, in which the filtering process includes a weighted addition process of the plural images.

According to a twelfth aspect of the invention, there is provided the image generating apparatus according to any one of the first to eleventh aspects, in which the scan is helical scan.

According to a thirteenth aspect of the invention, there is provided the image generating apparatus according to any one of the first to twelfth aspects, which further includes a display control unit configured to control display unit so as to display images corresponding to the first reconstruction planes but not to display images corresponding to the second reconstruction planes.

According to a fourteenth aspect of the invention, there is provided a radiation tomography imaging apparatus which includes:

a scanning unit configured to collect projection data by scanning an imaging object using a radiation source and a detector;

a first setting unit configured to set a plurality of first reconstruction planes in a body axis direction of the imaging object;

a second setting unit configured to set one or more second reconstruction planes different from the plural first reconstruction planes in the body axis direction of the imaging object;

a reconstruction unit configured to reconstruct a plurality of images corresponding to the first reconstruction planes and to be supplied to an operator and one or more images corresponding to the one or more second reconstruction planes and not to be supplied to the operator, based on the projection data; and a processing unit configured to perform an artifact reduction process on an image corresponding to a given first reconstruction plane using at least some of the images corresponding to the plural first reconstruction planes and at least some of the images corresponding to the one or more second reconstruction planes.

According to a fifteenth aspect of the invention, there is provided an image generating method which includes:

a determining step of determining projection data collected by scan of an imaging object using a radiation source and a detector;

a first setting step of setting a plurality of first reconstruction planes in a body axis direction of the imaging object;

a second setting step of setting one or more second reconstruction planes different from the plural first reconstruction planes in the body axis direction of the imaging object;

a reconstruction step of reconstructing a plurality of images corresponding to the plural first reconstruction planes and to be supplied to an operator and one or more images corresponding to the one or more second reconstruction planes and not to be supplied to the operator, based on the projection data; and a processing step of performing an artifact reduction process on an image corresponding to a given first reconstruction plane using at least some of the images corresponding to the plural first reconstruction planes and at least some of the images corresponding to the one or more second reconstruction planes.

According to a sixteenth aspect of the invention, there is provided a program for enabling a computer to function as the image generating apparatus according to any one of the first to thirteenth aspects.

Advantageous Effects of Invention

According to the above aspects of the invention, in the body axis direction of the imaging object, second reconstruction planes are set at different positions from the first reconstruction planes, the images on which are planned to be supplied to the operator, and the artifact reduction process is performed using at least images on the second reconstruction planes, so the number of images used for the artifact reduction process can be increased without widening the range in the body axis direction including these images.

In other words, continuity data in the body axis direction which is used for the artifact reduction process can be augmented. As a result, correction can be made with higher accuracy and artifacts of the reconstructed images which are supplied to the operator can be further reduced.

BRIEF DESCRIPTION OF DRAWINGS

FIG. 9 are views showing an example of an index function.

DESCRIPTION OF EMBODIMENTS

Next, an embodiment of the present invention will be described. The invention is not limited thereby.

Figure 1:
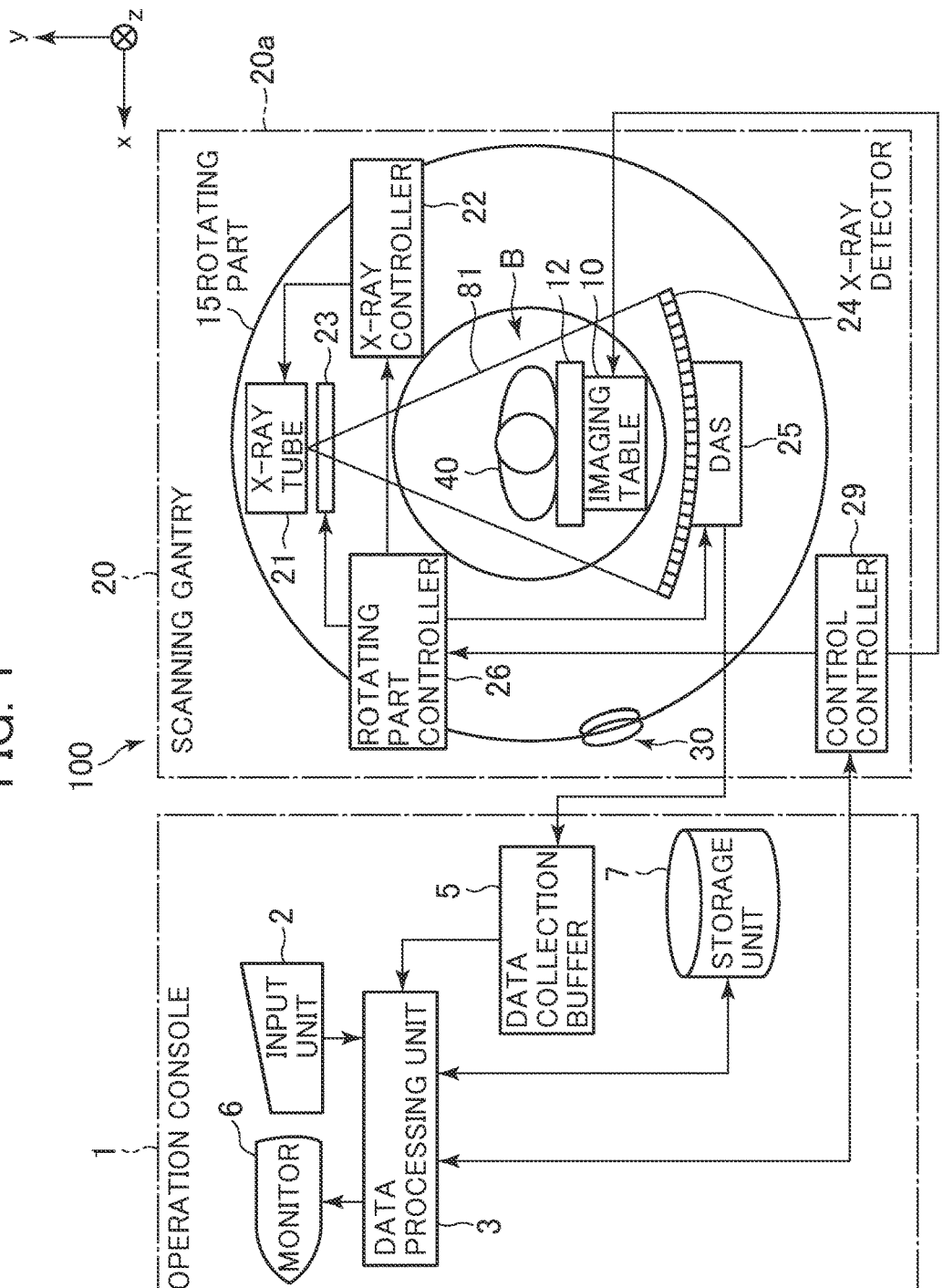
FIG. 1 is a diagram which schematically shows the configuration of an X-ray CT apparatus according to this embodiment.

FIG. 1 is a diagram which schematically shows the configuration of an X-ray CT apparatus according to this embodiment.

As shown in FIG. 1, the X-ray CT apparatus 100 includes an operation console 1, an imaging table 10, and a scanning gantry 20.

The operation console 1 includes an input unit 2 for receiving input from an operator 41, a data processing unit 3 for controlling various components for imaging a subject (imaging object) and performing data processing for generating an image, a data collecting buffer 5 for collecting data obtained by the scanning gantry 20, a monitor 6 for displaying an image, and a storage unit 7 for storing a program and data.

The imaging table 10 includes a cradle 12 which carries it into a bore B of the scanning gantry 20 with the subject 40 lying thereon. The cradle 12 is moved up and down and in a horizontal linear direction by a motor built in the imaging table 10. Here the direction of the body axis of the subject 40, namely the horizontal linear movement direction of the cradle 12 is referred to as the z-axis direction, the vertical direction is referred to as the y-axis direction, and the horizontal direction perpendicular to the z-axis direction and the y-axis direction is referred to as the x-axis direction.

The scanning gantry 20 is equipped with a rotating part 15 supported rotatably. The rotating part 15 includes an X-ray tube 21; an X-ray controller 22 for controlling the X-ray tube 21; an aperture 23 for shaping X rays 81 generated from the X-ray tube 21 into a fan beam or cone beam; an X-ray detector 24 for detecting the X rays 81 penetrating the subject 40; a DAS 25 for collecting an output signal from the X-ray detector 24 as data; and a rotating part controller 26 for controlling the X-ray controller 22 and the aperture 23. The main body of the scanning gantry 20 includes a control controller 29 which communicates control signals, etc. with the operation console 1 and the imaging table 10. The rotating part 15 and the main body of the scanning gantry 20 are electrically connected through a slip ring 30.

The X-ray tube 21 and the X-ray detector 24 face each other with an imaging space where the subject 40 is placed, namely the bore B of the scanning gantry 20, between them. As the rotating part 15 rotates, the X-ray tube 21 and the X-ray detector 24 rotate around the subject 40 while keeping their positional relation. The fan beam or cone beam of X rays 81 radiated from the X-ray tube 21 and shaped by the aperture 23 pass through the subject 40 and are irradiated on the detecting surface of the X-ray detector 24.

Here, the direction in which the fan beam or cone beam of X rays 81 spreads on the xy plane is expressed as the channel direction (CH direction), the direction of spread in the z-axis direction or the z-axis direction itself is expressed as the slice direction, and the direction toward the rotation center of the rotating part 15 on the xy plane is expressed as the isocenter direction (I direction).

The X-ray detector 24 is comprised of a plurality of detecting elements 24i arranged in the channel direction and slice direction. The number of detecting elements 24i in the channel direction is, for example, about 1000 in an angle range of 60 degrees and their arrangement interval is, for example, about 1 mm.

Figure 2:
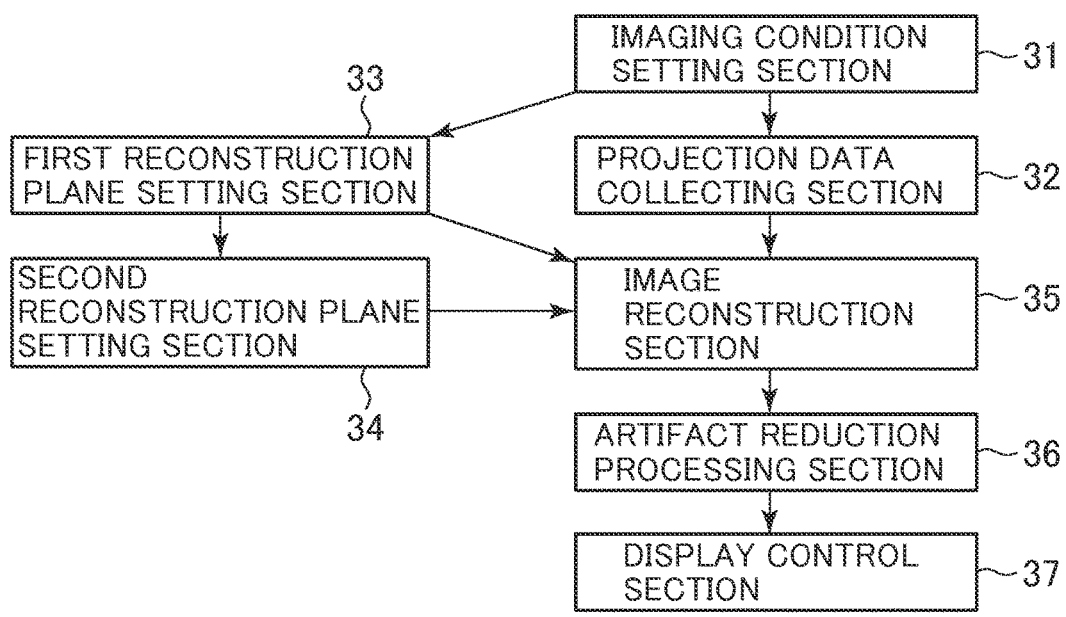
FIG. 2 is a functional block diagram showing the structure of a section for an image generating process in the X-ray CT apparatus.

FIG. 2 is a functional block diagram of the structure of the section for performing the image generating process in the X-ray CT apparatus. As shown in FIG. 2, the X-ray CT apparatus 100 includes an imaging condition setting section 31, a projection data collecting section 32, a first reconstruction plane setting section 33, a second reconstruction plane setting section 34, an image reconstruction section 35, an artifact reduction processing section 36, and a display control section 37. These sections are functionally implemented when the data processing unit 3 reads a program stored in the storage unit 7 and executes it.

Next, the functions of these sections will be described in more detail.

The imaging condition setting section 31 sets imaging conditions according to operation by the operator 41. For example, the imaging condition setting section 31 sets X-ray tube voltage, X-ray tube current, an imaging range in the z-axis direction (the body axis direction of the subject 40), slice thickness, helical pitch, target image noise level in the case of using a CT automatic exposure control system and so on, as imaging conditions.

The projection data collecting section 32 controls the imaging table 10 and the scanning gantry 20 so that the subject 40 is scanned according to the set imaging conditions. Projection data on a plurality of views of the subject 40 is collected by performing this scan.

The first reconstruction plane setting section 33 sets a plurality of first reconstruction planes corresponding to a plurality of images to be supplied to the operator 40 in the z-axis direction of the imaging space. The first reconstruction plane setting section 33 sets, for example, the plural first reconstruction planes according to the set imaging conditions, particularly the imaging range and slice thickness.

The second reconstruction plane setting section 34 sets one or more second reconstruction planes at different positions from the first reconstruction planes in the z-axis direction of the imaging space. An image on a second reconstruction plane is not intended to be supplied to the operator 41 but intended to be used in the artifact reduction process. For example, the second reconstruction plane setting section 34 sets one or more second reconstruction planes between every two first reconstruction planes adjacent to each other.

The image reconstruction section 35 reconstructs images corresponding to the first reconstruction planes and second reconstruction planes, based on the collected projection data. For example, a three-dimensional back projection process is used for reconstruction of the images.

The artifact reduction processing section 36 performs an artifact reduction process on the images on the first reconstruction planes using at least the images on the second reconstruction planes. The artifact reduction process includes, for example, a filtering process in the z-axis direction which uses the images on the first and second reconstruction planes lined up in the z-axis direction.

The display control section 37 controls the monitor 6 so as to display an image on a first reconstruction plane on which the artifact reduction process has been performed.

Next, the flow of the image generating process in the X-ray CT apparatus according to this embodiment will be described.

Figure 3:
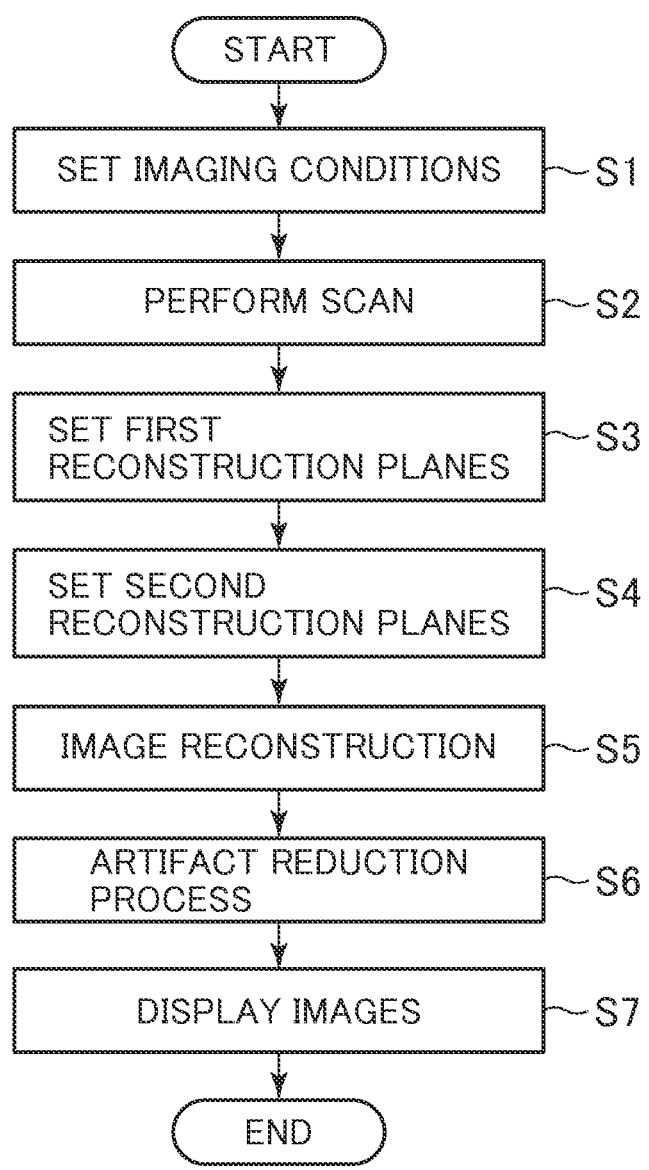
FIG. 3 is a flowchart showing the flow of the image generating process in the X-ray CT apparatus according to this embodiment.

FIG. 3 is a flowchart showing the flow of the image generating process in the X-ray CT apparatus according to this embodiment.

At step S1, the imaging condition setting section 31 sets imaging conditions according to operation by the operator 41. In this example, X-ray tube voltage, X-ray tube current, imaging range RS in the z-axis direction (the body axis direction of the subject 40), slice thickness Δz, etc. are set as imaging conditions.

At step S2, the projection data collecting section 32 controls the imaging table 10 and scanning gantry 20 according to the set imaging conditions, particularly X-ray tube voltage, X-ray current, imaging range RS, etc. to scan the subject 40. In this example, helical scan is performed as scan. The projection data collecting section 32 collects projection data on a plurality of views by the scan. The collected projection data is sent to the storage unit 7 and stored.

At step S3, the first reconstruction plane setting section 33 sets a plurality of first reconstruction planes s1 corresponding to a plurality of tomographic images planned to be supplied to the operator 41, in the z-axis direction of the imaging space.

Figure 4:
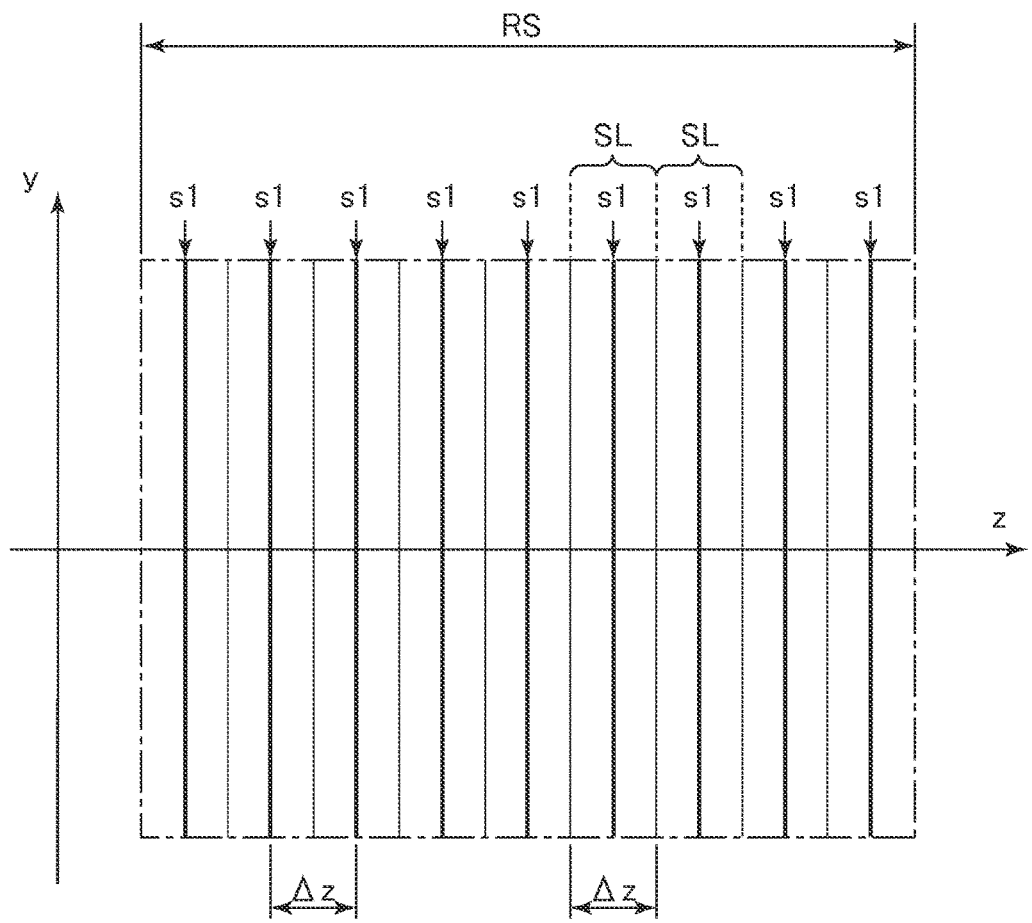
FIG. 4 is a view showing a setting example of first reconstruction planes.

FIG. 4 is a view showing a setting example of first reconstruction planes. In this example, as shown in FIG. 4, the space of the imaging range RS is sliced with slice thickness Δz and a first reconstruction plane s1 is set in the center of each slice SL in the z-axis direction. In this case, first reconstruction planes s1 are set at the same intervals as slice thickness Δz in the z-axis direction. The slice thickness Δz is, for example, 0.625 mm.

At step S4, the second reconstruction plane setting section 34 sets one or more second reconstruction planes s2 at different positions from the first reconstruction planes s1 in the z-axis direction of the imaging space.

Figure 5:
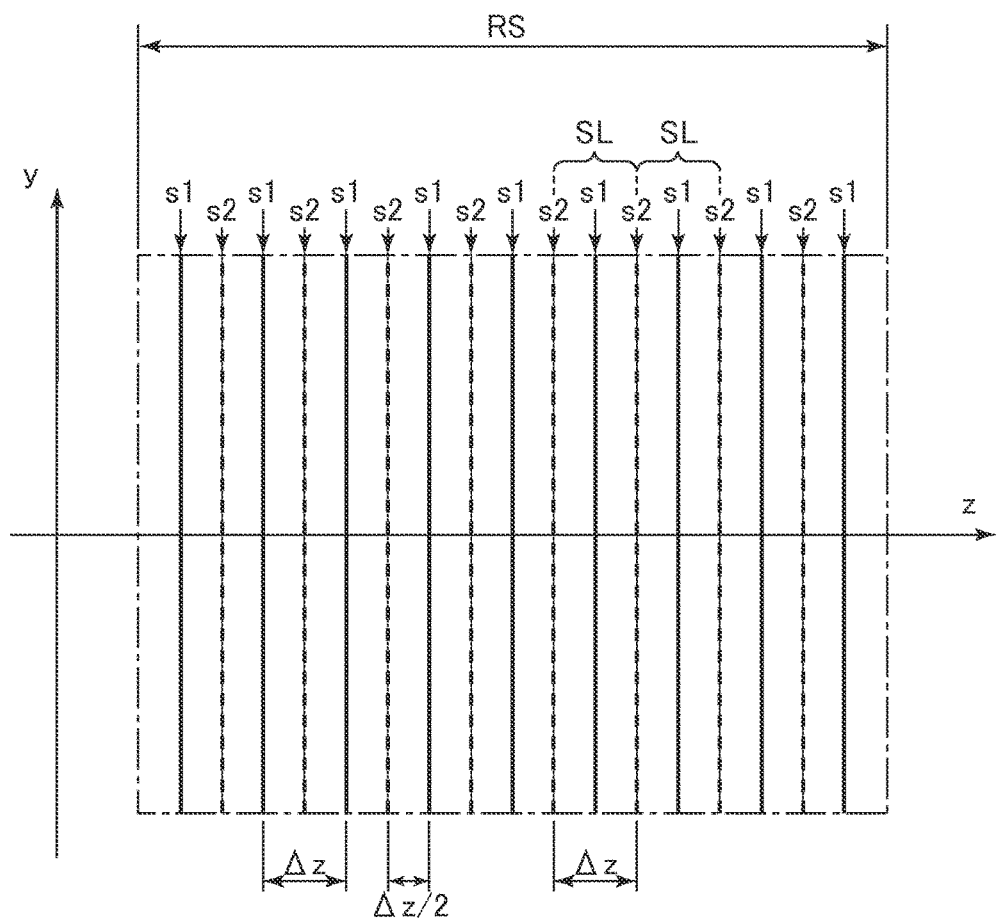
FIG. 5 is a view showing a setting example of second reconstruction planes.

FIG. 5 is a view showing a setting example of second reconstruction planes. In this example, as shown in FIG. 5, one second reconstruction plane s2 is set at the middle position between every two first reconstruction planes s1 adjacent to each other. In other words, the second reconstruction planes s2 are set so that first reconstruction planes s1 and second reconstruction planes s2 are alternately arranged at regular intervals in the z-axis direction. In this case, the second reconstruction planes s2 are set at the same intervals as slice thickness Δz in the z-axis direction. Therefore, the distance between a first reconstruction plane s1 and a second reconstruction plane s2 adjacent to the first reconstruction plane s1 is one half of the slice thickness Δz. In other words, the density of the first reconstruction planes s1 and second reconstruction planes s2 combined, or all reconstruction planes, is twice the reconstruction plane density of the first reconstruction planes s1 only planned to be supplied to the operator 41.

At step S5, the image reconstruction section 35 reconstructs images corresponding to the first reconstruction planes s1 and second reconstruction planes s2, based on the collected projection data.

In this example, images are reconstructed by performing preprocessing, beam hardening correction, z filter overlay processing, reconstruction function overlay processing, and three-dimensional back projection processing. In the three-dimensional back projection process, interpolation of projection data is not required. For this reason, in reconstructed images in this example, there are no errors caused by interpolation of projection data and the accuracy is high. In this example, reconstruction is made so that each reconstructed image has information on the space having slice thickness Δz with its reconstruction plane in the center of the space in the z-axis direction. The size of a reconstructed image is assumed to be, for example, 512 pixels (x-axis direction)×512 pixels (y-axis direction).

At step S6, the artifact reduction processing section 36 performs the artifact reduction process on the images on the first reconstruction planes s1. In this example, the artifact reduction process is performed using the images on the first reconstruction planes s1 and the images on the second reconstruction planes s2. The artifact reduction process in this example will be explained in detail later.

At step S7, the display control section 37 controls the monitor 6 so that the images on the first reconstruction planes s1 on which the artifact reduction process has been performed are displayed on the screen. The display control section 37 enables the images on the first reconstruction planes s1 to be displayed on the screen and supplied to the operator 41 since they are preplanned to be supplied to the operator 41 but it does not enable the images on the second reconstruction planes s2 to be displayed on the screen since they are not intended to be supplied to the operator 41.

Next, the artifact reduction process at step S6 will be explained in detail. In this example, the artifact reduction process is performed on the basis of pixels which constitute a processing object image Ga. Also in the artifact reduction process, based on a plurality of images near the processing object image Ga, analysis is made of pixel value variations in the z-axis direction of pixels in the same xy coordinates as a processing object pixel pa. Then, probability that the processing object pixel pa is an artifact is calculated based on the analysis result, and a filtering process in the z-axis direction is performed on the processing object pixel pa using a parameter depending on the probability. This filtering process is a weighted addition process of a plurality of reconstructed images lined up continuously in the z-axis direction near the processing object image Ga, in which the weighting factor is a parameter.

Next, the flow of the artifact reduction process in this example will be explained.

Figure 6:
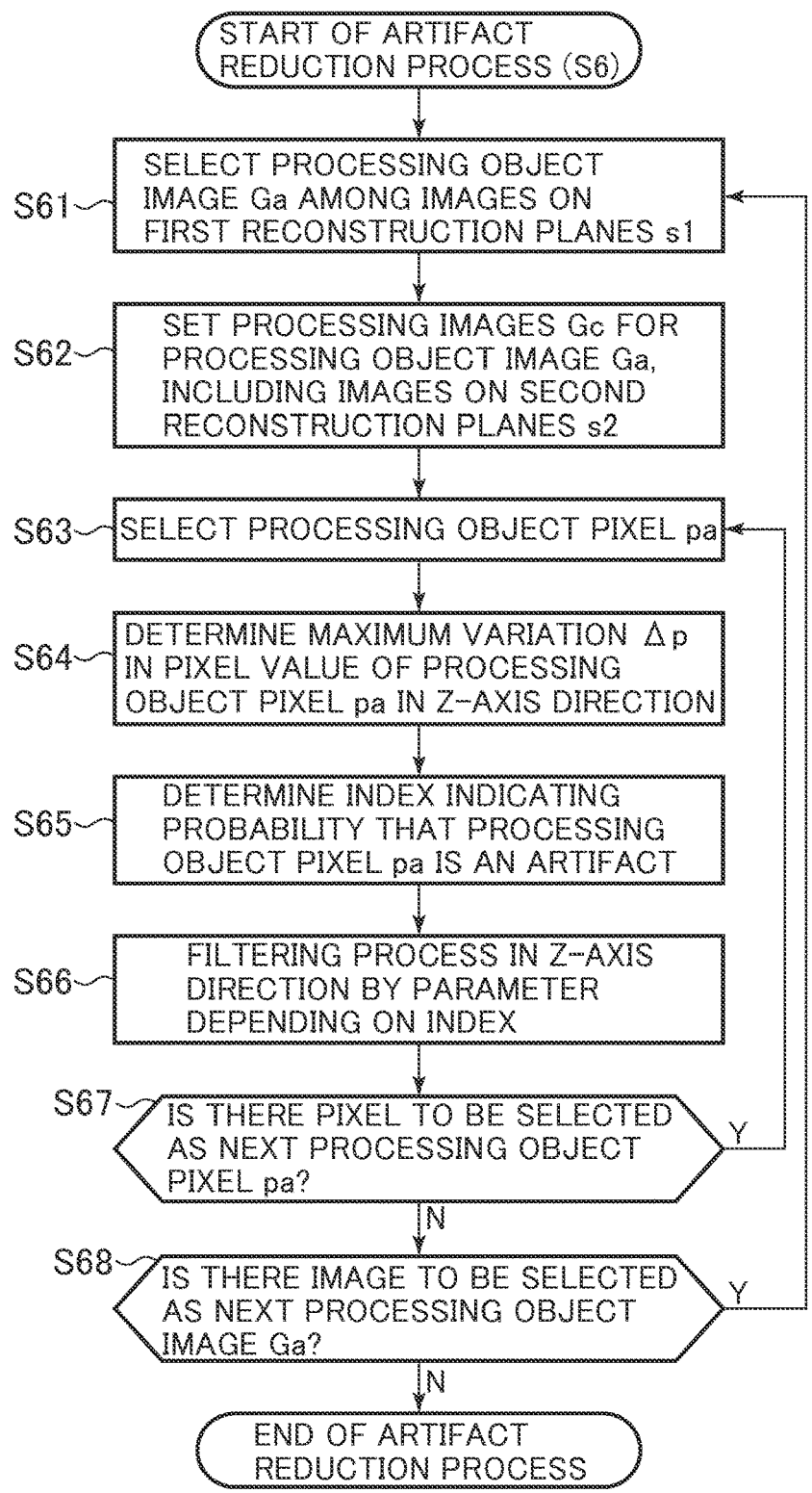
FIG. 6 is a flowchart showing the flow of an artifact reduction process in this example.

FIG. 6 is a flowchart showing the flow of the artifact reduction process in this example.

At step S601, a processing object image Ga is selected among the images on the plural first reconstruction planes s1 which are supplied to the operator 41.

At step S602, a given range which includes the processing object image Ga and has a given width in the z-axis direction is set as analysis range Rc. Then, the images corresponding to the first reconstruction planes s1 and second reconstruction planes s2 which are included in the analysis range are taken as processing images Gc.

Figure 7:
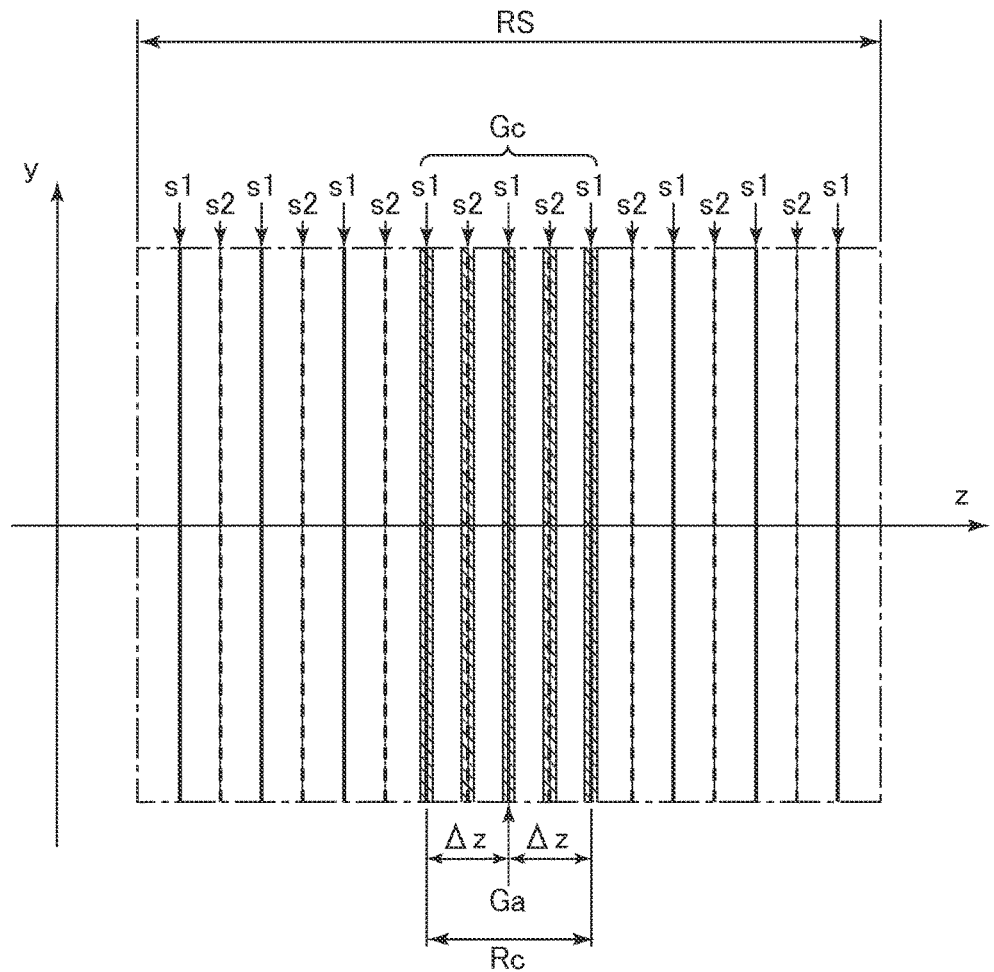
FIG. 7 is a view showing a setting example of an analysis range and processing images.

FIG. 7 is a view showing a setting example of the analysis range and processing images. In this example, as shown in FIG. 7, the range having width of ±slice thickness Δz in the z-axis direction with the reconstruction plane of the processing object image Ga in the center is taken as analysis range Rc. Consequently, five images nearest to the processing object image Ga including the processing object image Ga, namely an image as the processing object image Ga on the first reconstruction plane s1, two images on the two reconstruction planes s2 on both adjacent sides thereof, and two images on the two first reconstruction planes s1 located outside them, are taken as processing images Gc.

At step S603, a processing object pixel pa in the processing object image Ga is selected.

At step S604, as for pixels in the same xy coordinates in the processing images Gc as the processing object pixel pa, pixel value variations in the z-axis direction are determined and pixel value maximum variation (maximum amplitude) Δp is determined.

Figure 8:
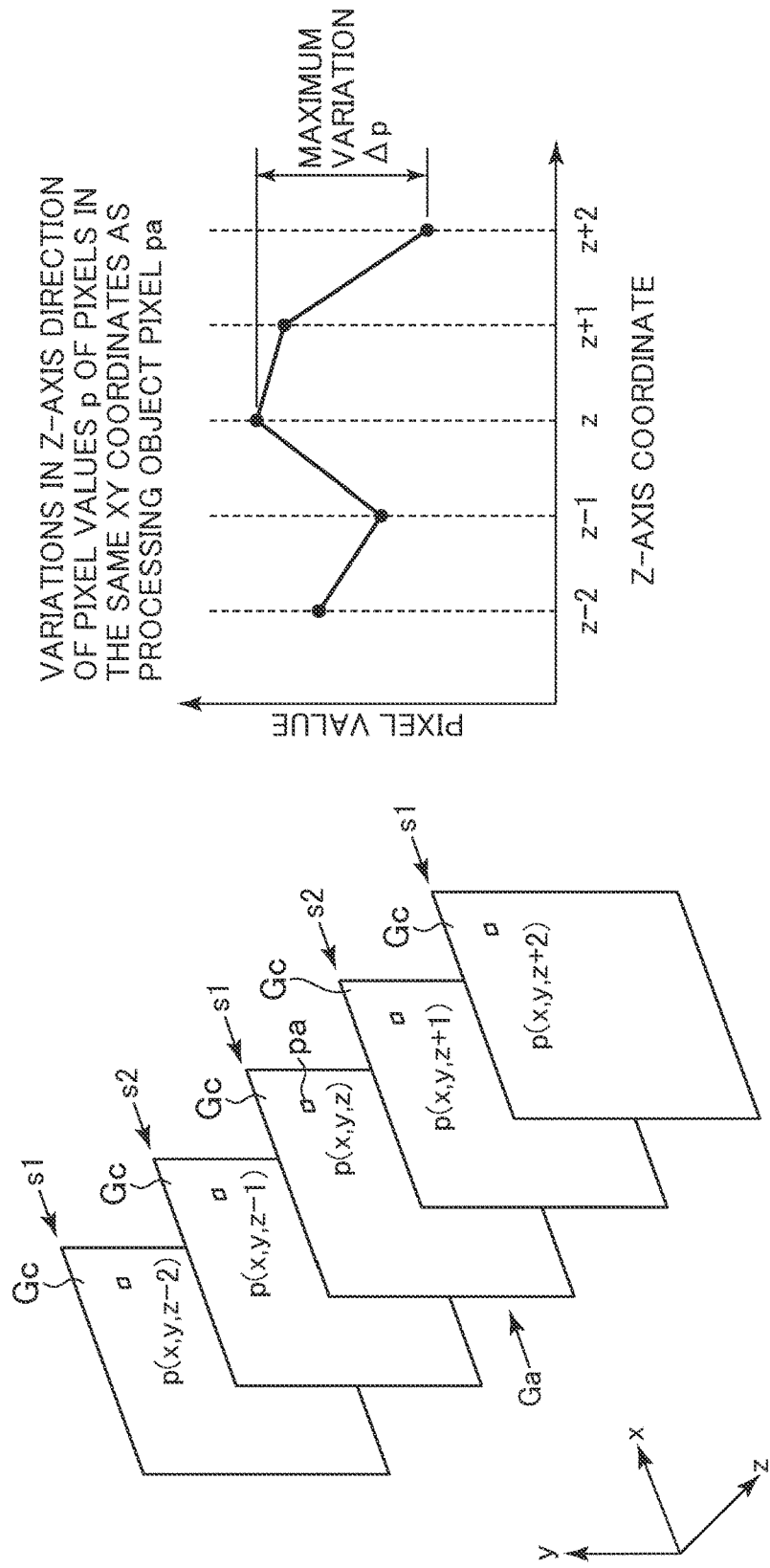
FIG. 8 is a view for explaining the process of determining the maximum variation of the pixel value corresponding to a processing object pixel in the z-axis direction.

FIG. 8 is a view for explaining the process of determining the maximum variation of the pixel value corresponding to the processing object pixel in the z-axis direction.

In this example, as shown in FIG. 8, as for the pixels in the same xy coordinates as the processing object pixel pa, in the five processing images Gc lined up in the z-axis direction with the processing object image Ga in the center, variations in pixel value p in the z-axis direction are determined. Then, maximum variation Δp in pixel value p in the z-axis direction, namely the value obtained by subtracting the minimum value from the maximum value in pixel value p is determined.

At step S605, an index which indicates the probability that the processing object pixel pa is an artifact is determined based on the magnitude of the pixel value maximum variation Δp, using a prescribed index function f.

FIG. 9 are views showing an example of the index function which expresses the relation between pixel value maximum variation Δp and index. In this example, the pixel value is a so-called CT value (HU). Also the index is defined to indicate the probability that the processing object pixel pa is an artifact, by a value of 0 to 1. Here, when index=0, the probability is the lowest and when index=1, the probability is the highest.

Next, the meaning of the index function shown in FIG. 9 will be explained. Generally, when the pixel value maximum variation Δp is less than a prescribed lower limit value, the pixel may be assumed to represent a bone or soft region extending continuously in the z-axis direction. In this case, the pixel is considered to have no probability that it is an artifact and the index is set to 0. Conversely, when the pixel value maximum variation Δp exceeds a prescribed upper limit value, the pixel may be assumed to represent a region of transition from a bone region to a soft region or from a soft region to a bone region in the z-axis direction. Thus, in this case as well, the pixel is considered to have no probability that it is an artifact and the index is set to 0. On the other hand, when the pixel value maximum variation Δp is between the prescribed upper limit value and the prescribed lower limit value, the pixel may be assumed to be part of an artifact, for example, part of a windmill helical artifact or cone-beam artifact. Therefore, in this case, the pixel is considered to have probability that it is an artifact and the index is set in the range from 0 to 1.

In the index functions in FIGS. 9(a) to 9(d), the range of X1 to X2 is, for example, adjusted to approximately 3 to 200, and depending on the imaging conditions, to approximately 10 to 200.

In this example, the index correlated with the maximum variation Δp in the pixel values obtained using one of the index functions shown in FIG. 9 is determined as the index of the processing object pixel pa.

At step S606, the filtering process is performed on the processing object pixel pa. At this time, the parameter for the filtering process is determined depending on the index of the processing object pixel pa. In this example, the filtering process is a weighted addition process of analyzed images Gc and the parameter is the weighting factor in the weighted addition process. The pixel value p' (x, y, z) after the filtering process, of the pixel value p (x, y, z) of the processing object pixel pa, can be expressed, for example, by the following equation:

$$p'(x,y,z)=\Sigma_{i=-2}^{+2}p(x,y,z+i)\cdot g(i,\text{index}) \quad \text{[Equation 1]}$$

Here, g (i, index) denotes the weighting factor of the image on the i-th reconstruction plane. For example, in the filtering process of the processing object pixel pa, the weighting factor can be set as follows.

When index=1, for example, the weighting factors g(−2, 1) to g(+2, 1) by which pixel values p(x, y, z−2) to p(x, y, z+2) are multiplied are 0.2, 0.2, 0.2, 0.2 and 0.2 respectively.

When index=0.5, for example, the weighting factors g(−2, 0.5) to g(+2, 0.5) by which pixel values p(x, y, z−2) to p(x, y, z+2) are multiplied are 0.1, 0.2, 0.4, 0.2 and 0.1 respectively.

When index=0, for example, the weighting factors g(−2, 0) to g(+2, 0) by which pixel values p(x, y, z−2) to p(x, y, z+2) are multiplied are 0, 0, 1.0, 0 and 0 respectively.

In short, when the probability that the processing object pixel pa is an artifact is higher, the pixel value of the pixel is smoothed in the z-axis direction; when the probability is lower, the pixel value of the pixel is made to remain as the original pixel value.

At step S607, a decision is made as to whether there is a pixel to be set as the next processing object pixel pa. If there is such pixel, the process returns to step S603 where the processing object pixel pa is newly selected. If there is no such pixel, the process proceeds to step S608.

At step S608, a decision is made as to whether there is an image to be set as the next processing object image Ga. If there is an image to be set as the next processing object image Ga, the process returns to step S601 where the processing object image Ga is newly selected. If there is no such image, the artifact reduction process is ended.

Next, the ordinary filtering process and the filtering process proposed herein will be compared and discussed.

Usually the filtering processes use reconstructed images within a given range which includes the processing object image Ga and has a certain width in the z-axis direction.

Here, the ordinary filtering process uses only the reconstructed images planned to be supplied to the operator 41, namely the images corresponding to the first reconstruction planes s1 in this example.

Figure 10:
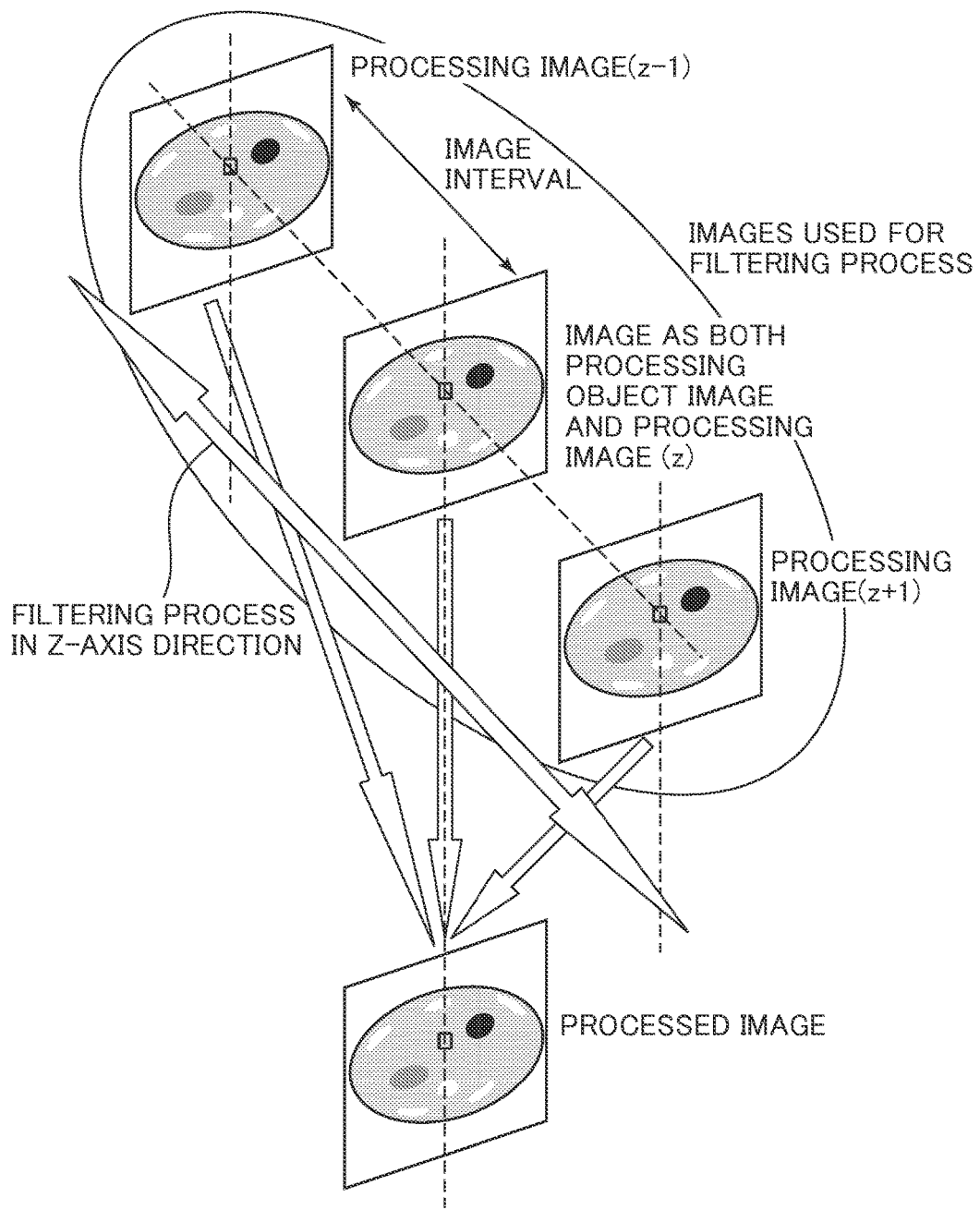
FIG. 10 is a view for explaining an ordinary filtering process.

FIG. 10 is a view for explaining the ordinary filtering process. For example, as shown in FIG. 10, the filtering process is performed using the images on the first reconstruction planes s1 in the range having the width of ±slice thickness Δz (twice the slice thickness Δz). In other words, the images used for the filtering process are the following three images: an image as the processing object image Ga on a first reconstruction plane s1 and images on two other first reconstruction planes s1 nearest to the processing object image Ga.

This method is a method which uses the images planned to be supplied to the operator 41 and reconstructed as they are, and the idea is very natural and very efficient. However, in this method, the images used for the filtering process are only the images preplanned to be supplied to the operator 41 and the density of images used for the filtering process in the z-axis direction is determined and fixed by the imaging conditions such as slice thickness. If the range of images used for the filtering process in the z-axis direction is widened, variation between images within this range in the z-axis direction of the structure of the imaging object would be excessive and the accuracy of the pixel values after the filtering process, of the pixels depicting the structure would worsen. For this reason, the range of images used for the filtering process in the z-axis direction must be limited so that variation within the range in the z-axis direction of the structure is below a certain level. As a result, the number of images used for the filtering process is almost determined by the set slice thickness, etc. In other words, the artifact reduction effect of the filtering process largely depends on the set slice thickness and if the minimum slice thickness allowed in the specification is set, the effect is maximal.

On the other hand, in the method proposed herein, beyond the natural idea that the artifact reduction process is performed using images to be supplied to the operator 41 as they are, images on second reconstruction planes s2 which are not intended to be supplied to the operator 41 are purposely generated and the filtering process is performed using these images.

Figure 11:
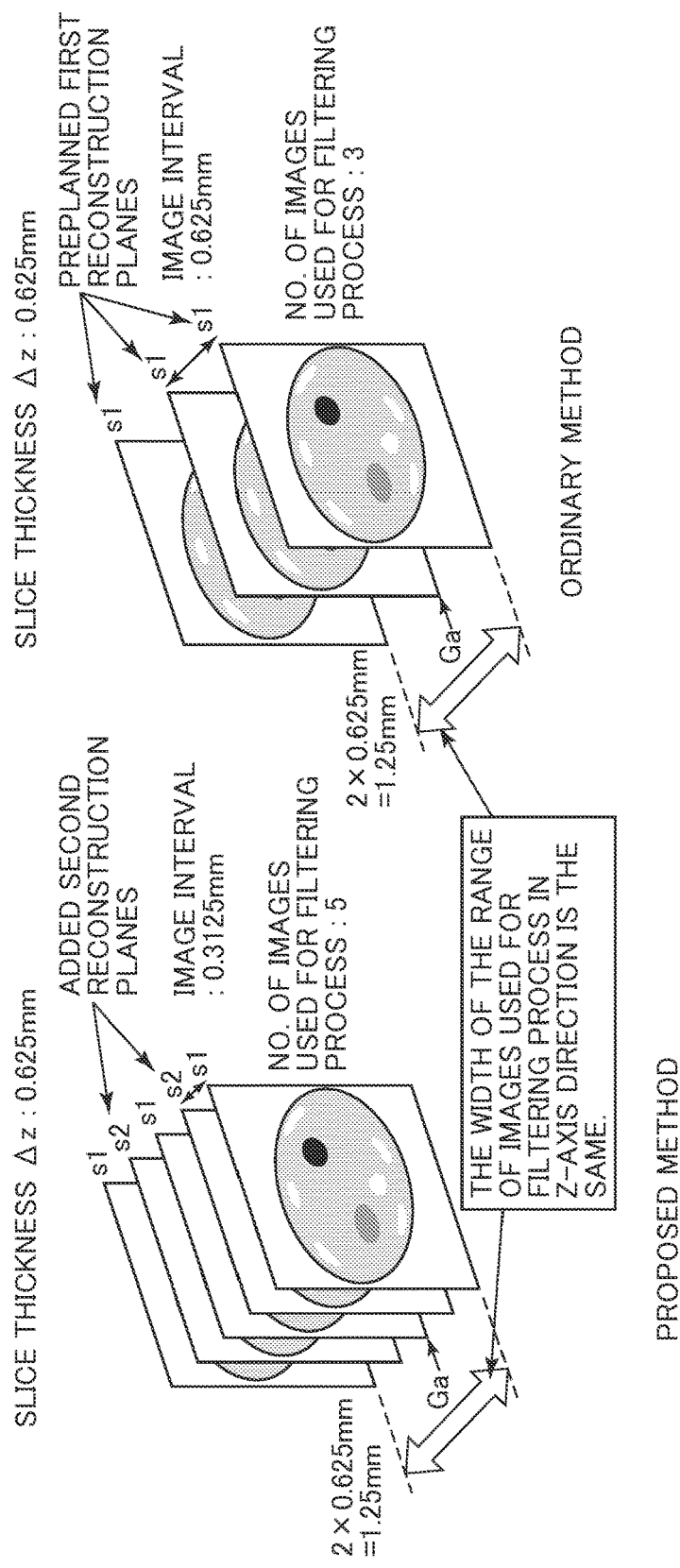
FIG. 11 are views for explaining the filtering process by the method proposed herein.

FIG. 11 is a view for explaining the filtering process by the proposed method. For example, as shown in FIG. 11, a second reconstruction plane s2 is set between every two first reconstruction planes s1 adjacent to each other. Then the filtering process is performed using images on the reconstruction planes which are within the range having the width of ±slice thickness Δz with the reconstruction plane corresponding to the processing object image Ga in the center. In other words, the images used for the filtering process are five images in total which include an image on a first reconstruction plane s1 as the processing object image Ga and images on two other first reconstruction planes s1 nearest to the processing object image Ga, plus images on two second reconstruction planes s2 each located between these first reconstruction planes s1.

In this method, by increasing the density of images in the z-axis direction, the number of images in the range can be increased while the range of images used for the filtering process in the z-axis direction is maintained, so the artifact reduction effect is higher than in the ordinary method. Particularly when probability that the pixel region of the processing object image is an artifact is calculated based on variations in the z-axis direction of the pixel values of a plurality of images continuous in the z-axis direction and the parameter for the filtering process is changed depending on the probability, further improvement in the artifact reduction effect can be expected.

Here, it is considered how the pixel values of pixels in the same coordinates vary with a slight change in the position of a reconstructed image in the z-axis direction. As for pixels depicting the structure as the imaging object, the pixel values tend to be almost maintained with a slight change in the position of a reconstructed image in the z-axis direction. On the other hand, as for pixels depicting an artifact, the pixel values tend to vary largely with a slight change in the position of a reconstructed image in the z-axis direction. If the artifact is a helical artifact attributable to helical scan or a cone-beam artifact attributable to cone-beam projection data, the tendency is significant. Therefore, in the proposed method, differentiation between the structure as the imaging object and an artifact can be made with higher accuracy and the filtering process can be further optimized. When the images used for the filtering process are increased by increasing the density of images in the z-axis direction, the artifact reduction effect is enhanced. However, an increase in the density of images in the z-axis direction means an increase in the number of images to be reconstructed, resulting in longer image reconstruction time. Therefore, in implementation, the number of second reconstruction planes and their interval must be set with due consideration to the balance between the image accuracy after the filtering process and the time required for the process.

As a preferable example of second reconstruction plane setting, when the minimum setting of slice thickness Δz is 0.625 mm, a possible example is that a second reconstruction plane is set between every two first reconstruction planes adjacent to each other, as shown in FIG. 11. As a preferable example of images used for the filtering process, a possible example is that they are images on the reconstruction planes within the range having the width of ±slice thickness Δz with the reconstruction plane corresponding to the processing object image in the center, as shown in FIG. 11.

Next, an example of comparison of actually obtained images will be shown.

Figure 12:
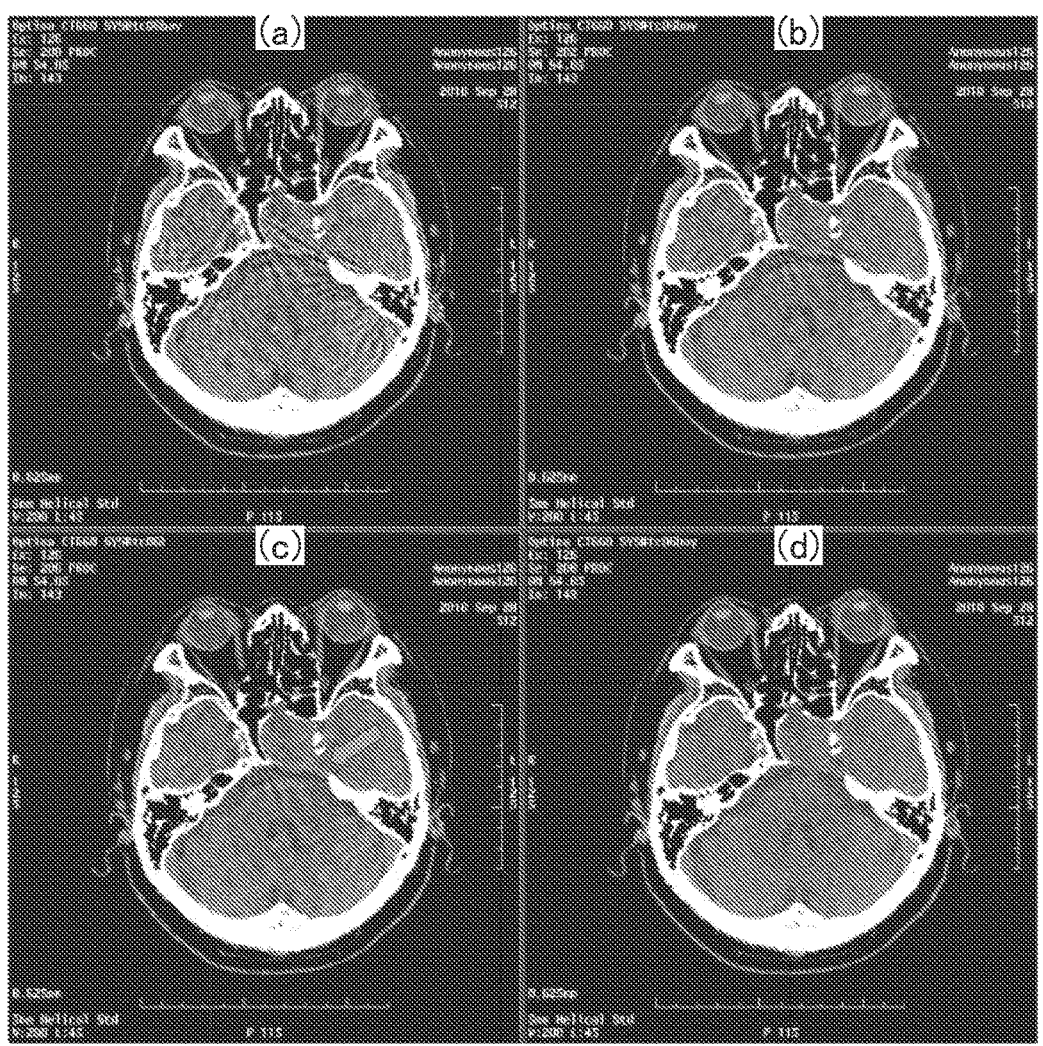
FIG. 12 is a view showing an example of comparison of actually obtained images.

FIG. 12 are views showing an example of comparison of actually obtained images. The images in the figures are all tomographic images based on the same projection data obtained by helical scan of a human head. The slice thickness is 0.625 mm. FIG. 12(a) is an original image before the artifact reduction process. From this image, artifacts are observed around the ear bones. FIG. 12(b) is an image after the artifact reduction process by the conventional method in which a total of three images, a processing object image and images on two first reconstruction planes nearest to it, are used for determination of the index and the filtering process. From this image, improvement of artifacts is observed but there remain artifacts. FIG. 12(c) is an image after the artifact reduction process by the conventional method in which the parameter for the filtering process is strengthened. From this figure, improvement of artifacts is observed but artifacts remain as indicated by the arrow. FIG. 12(d) is an image after the artifact reduction process by the proposed method in which the processing object image Ga, images on two first reconstruction planes s1 nearest to it and images on two second reconstruction planes s2 between them are used for determination of the index and the filtering process. From this figure, it is observed that the artifact reduction effect is higher than in the conventional method.

According to this embodiment as mentioned above, second reconstruction planes s2 at different positions from the first reconstruction planes s1, the images on which are planned to be supplied to the operator 41, are set in the z-axis direction of the imaging object and the artifact reduction process is performed using at least the images on the second reconstruction planes s2, so the number of images used for the artifact reduction process can be increased without widening the range in the z-axis direction including these images. In other words, continuity data in the z-axis direction which is used for the artifact reduction process can be augmented. As a result, correction can be made with higher accuracy and artifacts of the reconstructed images supplied to the operator 41 can be further reduced.

Also, according to this embodiment, since the second reconstruction planes s2 are set near the processing object image Ga, the artifact reduction process can be performed using a larger number of images on plural reconstruction planes at slightly different positions in the z-axis direction. By doing so, discriminability can be increased between the structure as the imaging object whose pixel values scarcely vary with a slight positional change in the z-axis direction and an artifact whose pixel values are likely to vary largely, so a larger artifact reduction effect can be achieved. Particularly, a windmill artifact which appears on an image reconstructed based on projection data obtained by helical scan has a nature that it reacts to positional change in the z-axis direction very sensitively and its pixel value varies largely. Therefore, in this embodiment, a very large artifact reduction effect can be achieved on helical artifacts.

Also, according to this embodiment, in a plurality of images in a given range in the z-axis direction including the processing object image Ga, variations in the pixel values p of pixels in the same xy coordinates as the processing object pixel pa are determined, probability that the processing object pixel pa is an artifact is calculated from the variations, and the filtering process in the z-axis direction is performed by a parameter depending on the probability, and the images on the second reconstruction planes s2 are also used as a plurality of images within the given range including the processing object image Ga, so discriminability between the structure as the imaging object and an artifact can be increased and artifacts can be further reduced.

Also, according to this embodiment, since the distance between the first reconstruction plane s1 corresponding to the processing object image Ga and a second reconstruction plane s2 nearest to this reconstruction plane is smaller than the minimum slice thickness that the operator 41 can set, the density of images in the z-axis direction is higher than when the minimum slice thickness that the operator 41 can set is set and the artifact reduction effect can be higher than the maximum level in the past.

The present invention is not limited to this embodiment and various modifications may be made without departing from the gist of the invention.

One example may be that probability that the processing object pixel pa is an artifact is calculated with higher accuracy and only when the probability exceeds a certain level, the artifact reduction process is performed on the processing object pixel pa. For example, the following process may be carried out. First, an index is calculated for each of the pixels in the region around the processing object pixel pa, or the whole region of the processing object image Ga or a given region as an occupied region of the subject in the same way as in the case of the processing object pixel pa. Next, the percentage of pixels whose index exceeds threshold 0 among the pixels constituting the given region is calculated. If this percentage exceeds a certain level, the processing object pixel pa is considered to be an artifact and only in this case, a process for reducing artifacts such as filtering is performed on the processing object pixel pa.

Also, for example, the setting of second reconstruction planes s2 and the setting of analysis range Rc are not limited to those in this embodiment and other various settings are possible. For example, the analysis range Rc may be a range which includes the processing object image Ga and 2N images nearest to the processing object image Ga (N≥2), in which the image on the first reconstruction plane s1 as the processing object image Ga and 2N images on the first reconstruction planes s1 and second reconstruction planes s2 lined up on both adjacent sides thereof are taken as processing images Gc.

Figure 13:
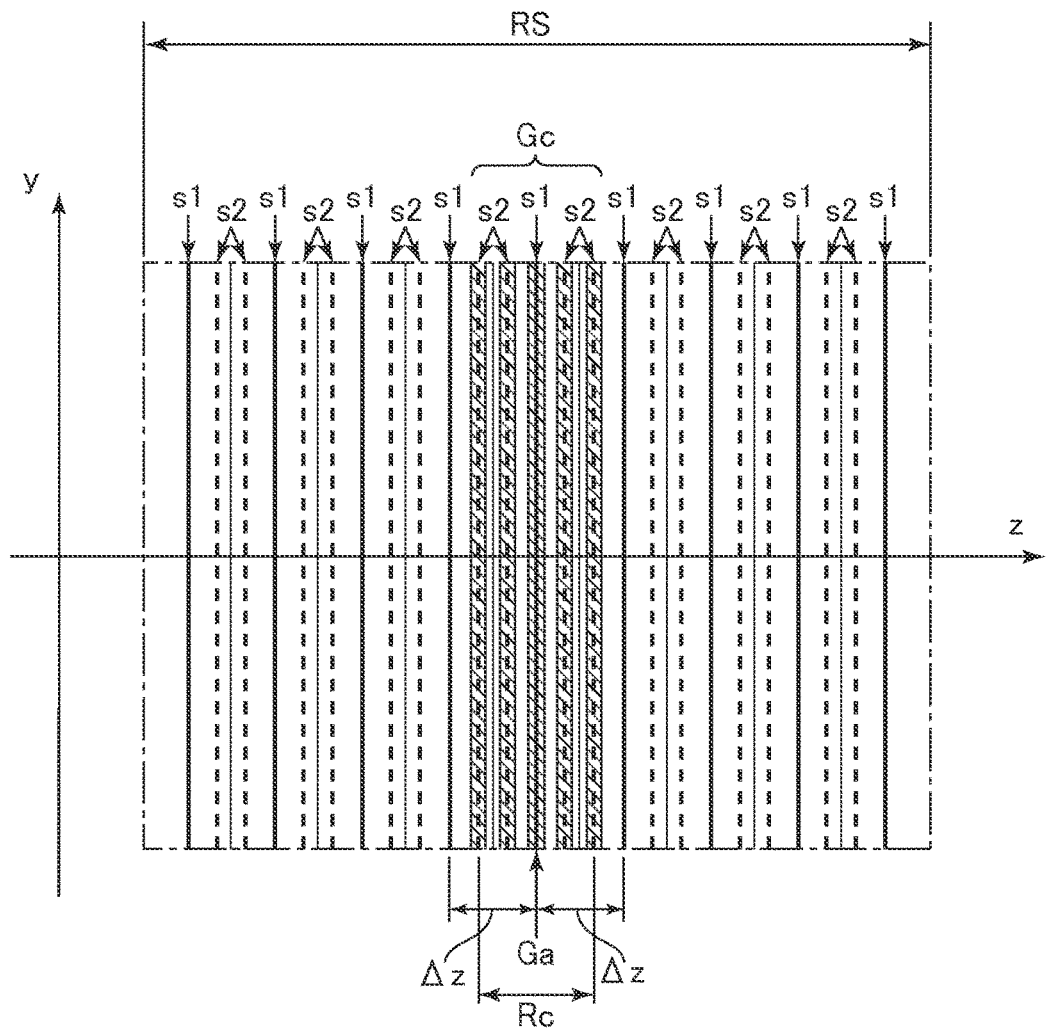
FIG. 13 is a view showing another first setting example of second reconstruction planes.
Figure 14:
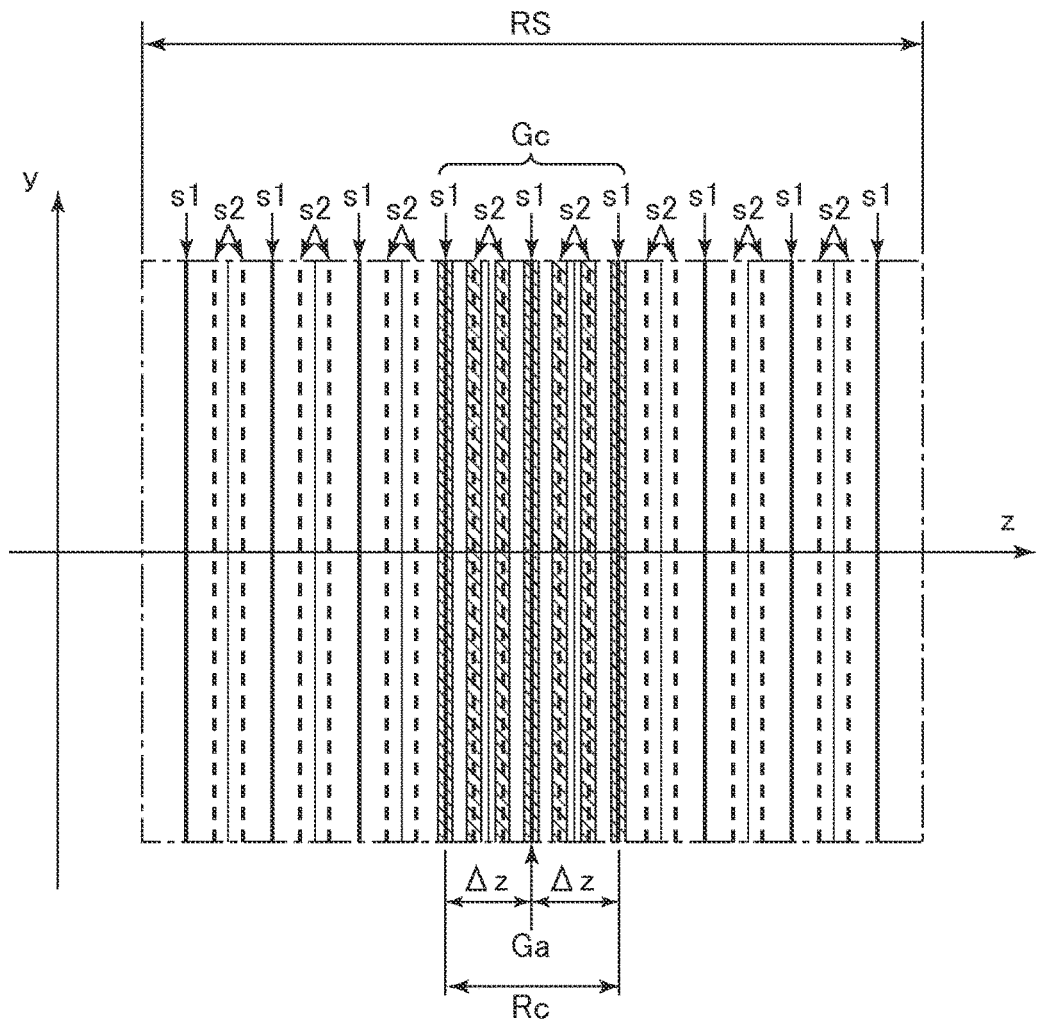
FIG. 14 is a view showing another second setting example of second reconstruction planes.

FIGS. 13 and 14 are views showing other setting examples of second reconstruction planes. As shown in FIG. 13, N second reconstruction planes s2 (N≥2) may be set between every two first reconstruction planes s1 adjacent to each other. In this case, for example, as shown in FIG. 13, the analysis range Rc may be a range which includes the processing object image Ga and 2N images nearest to the processing object image Ga, in which the image on the first reconstruction plane s1 as the processing object image Ga and 2N images on the second reconstruction planes s2 on both adjacent sides thereof are taken as processing images Gc. Also as shown in FIG. 14, the analysis range Rc may be a range which includes the processing object image Ga and 2N+2 images nearest to the processing object image Ga, in which the image on the first reconstruction plane s1 as the processing object image Ga, 2N images on the second reconstruction planes s2 and two images on first reconstruction planes s1 on both adjacent sides thereof are taken as processing images Gc.

Also, for example, in this embodiment, in a plurality of images near the processing object image Ga, pixel value maximum variation Δp in the z-axis direction in the pixels in the same xy coordinates as the processing object pixel pa is found and an index is determined based on this maximum variation Δp and the filtering process is performed using a parameter depending on the index. However, unlike this approach, the filtering process may be performed on the processing object pixel pa using a parameter depending on the above pixel value maximum variation Δp without determining an index.

Also, for example, whereas in this embodiment the artifact reduction process is performed on all the images on the first reconstruction planes s1 to be supplied to the operator 41, the artifact reduction process may be performed only on a specific image among them. In this case, at least one image on a second reconstruction plane s2 may be reconstructed near the processing object image Ga as the specific image and then the artifact reduction process may be performed using the image on the second reconstruction plane s2.

Also, for example, whereas this embodiment is an X-ray CT apparatus, an image generating apparatus which performs the above image generating process is also an example of an embodiment of the invention. Furthermore, a program for enabling a computer to function as such an image generating apparatus and a storage medium for storing this program are also examples of an embodiment of the invention.

Also, for example, whereas this embodiment is an X-ray CT apparatus, the invention may be applied to a PET-CT apparatus or SPECT-CT apparatus as an X-ray CT apparatus combined with a PET or SPECT.

REFERENCE SIGNS LIST

1 . . . operation console
2 . . . input unit
3 . . . data processing unit
5 . . . data collection buffer
6 . . . monitor
7 . . . storage unit
10 . . . imaging table
12 . . . cradle
15 . . . rotating part
20 . . . scanning gantry
21 . . . X-ray tube
22 . . . X-ray controller
23 . . . aperture
24 . . . X-ray detector
25 . . . detector controller
26 . . . rotating part controller
28 . . . X-ray detector
29 . . . control controller
30 . . . slip ring
31 . . . imaging condition setting section
32 . . . projection data collecting section
33 . . . first reconstruction plane setting section
34 . . . second reconstruction plane setting section
35 . . . image reconstruction section
36 . . . artifact reduction processing section
37 . . . display control section
40 . . . subject
41 . . . operator
81 . . . X ray
100 . . . X-ray CT apparatus

The invention claimed is:

1. An image generating apparatus comprising:
a determiner configured to determine projection data collected by a scan of an imaging object using a radiation source and a detector;
a first setter configured to set a plurality of first reconstruction planes in a body axis direction of the imaging object;
a second setter configured to set one or more second reconstruction planes different from the plurality of first reconstruction planes in the body axis direction of the imaging object, wherein the plurality of first reconstruction planes are located at different locations along the body axis direction from the one or more second reconstruction planes;

a reconstructor configured to reconstruct a plurality of images corresponding to the plurality of first reconstruction planes and to be supplied to an operator and one or more images corresponding to the one or more second reconstruction planes, based on the projection data; and a processor configured to perform an artifact reduction process on an image corresponding to a given first reconstruction plane using a plurality of images corresponding to a plurality of reconstruction planes including the plurality of first reconstruction planes and at least one of the one or more second reconstruction planes, wherein the processor is further configured to:

calculate a probability that a pixel in the image corresponding to the given first reconstruction plane represents an artifact based on pixel value variations in the plurality of images corresponding to the plurality of reconstruction planes, the pixel value variations are variations in the body axis direction; and perform the artifact reductions process on the pixel based on the probability.

2. The image generating apparatus according to claim 1, wherein the second setter sets one or more second reconstruction planes in a given range including the given first reconstruction plane and one or more other first reconstruction planes near the given first reconstruction plane, and wherein the processor performs the artifact reduction process using a plurality of images corresponding to the plural reconstruction planes included in the given range.

3. The image generating apparatus according to claim 2, wherein the given range is a range which includes the given first reconstruction plane and two first reconstruction planes on both adjacent sides thereof, and wherein the second setter sets one or more second reconstruction planes between the given first reconstruction plane and each of the two first reconstruction planes on the both adjacent sides thereof.

4. The image generating apparatus according to claim 1, wherein the second setter sets one second reconstruction plane at every middle position between two first reconstruction planes adjacent to each other.

5. The image generating apparatus according to claim 1, wherein the first setter sets the plurality of first reconstruction planes based on conditions of an imaging range and slice thickness which are specified by the operator.

6. The image generating apparatus according to claim 1, wherein distance between the given first reconstruction plane and a second reconstruction plane nearest to the given first reconstruction plane is smaller than minimum slice thickness that the operator can set.

7. The image generating apparatus according to claim 1, wherein the processor performs the artifact reduction process on a basis of pixels constituting an image corresponding to the given first reconstruction plane.

8. The image generating apparatus according to claim 7, wherein the processor calculates probability that a given pixel in the image corresponding to the given first reconstruction plane represents an artifact, using images corresponding to first and second reconstruction planes included in the given range, and controls a parameter for the artifact reduction process on the pixel according to the probability.

9. The image generating apparatus according to claim 1, wherein the reconstructor reconstructs the images by a three-dimensional back projection process on the projection data.

10. The image generating apparatus according to claim 1, wherein the artifact reduction process includes a filtering process.

11. The image generating apparatus according to claim 10, wherein the filtering process includes a weighted addition process of the plurality of images.

12. The image generating apparatus according to claim 1, wherein the scan is helical scan.

13. The image generating apparatus according to claim 1, further comprising a display controller configured to control a display so as to display images corresponding to the plurality of first reconstruction planes but not to display images corresponding to the second reconstruction planes.

14. A radiation tomography imaging apparatus comprising:

a scanner configured to collect projection data by scanning an imaging object using a radiation source and a detector, a first setter configured to set a plurality of first reconstruction planes in a body axis direction of the imaging object;

a second setter configured to set one or more second reconstruction planes different from the plurality of first reconstruction planes in the body axis direction of the imaging object, wherein the plurality of first reconstruction planes are located at different locations along the body axis direction from the one or more second reconstruction planes;

a reconstructor configured to reconstruct a plurality of images corresponding to the plurality of first reconstruction planes and to be supplied to an operator and one or more images corresponding to the one or more second reconstruction planes, based on the projection data; and a processor configured to perform an artifact reduction process on an image corresponding to a given first reconstruction plane using at least some of the images corresponding to the plurality of first reconstruction planes and at least some of the images corresponding to the one or more second reconstruction planes, wherein the processor is further configured to calculate a probability that a pixel in the image corresponding to the given first reconstruction plane represents an artifact based on pixel value variations in the images corresponding to the plurality of first reconstruction planes and the images corresponding to the one or more second reconstruction planes, the pixel value variations are variations in the body axis direction; and perform the artifact reduction process on the pixel based on the probability.

15. An image generating method comprising:

determining projection data collected by a scan of an imaging object using a radiation source and a detector;

setting a plurality of first reconstruction planes in a body axis direction of the imaging object;

setting one or more second reconstruction planes different from the plurality of first reconstruction planes in the body axis direction of the imaging object, wherein the plurality of first reconstruction planes are located at different locations along the body axis direction from the one or more second reconstruction planes;

reconstructing a plurality of images corresponding to the plurality of first reconstruction planes and to be supplied to an operator and one or more images corresponding to the one or more second reconstruction planes, based on the projection data; and performing an artifact reduction process on an image corresponding to a given first reconstruction plane using at least some of the images corresponding to the plurality of first reconstruction planes and at least some of the images corresponding to the one or more second reconstruction planes, wherein performing the artifact reduction process on the image comprises:

calculating a probability that a pixel in the image corresponding to the given first reconstruction plane represents an artifact based on pixel value variations in the images corresponding to the plurality of first reconstruction planes and the images corresponding to the one or more second reconstruction planes, the pixel value variations are variations in the body axis direction; and performing the artifact reduction process on the pixel based on the probability.

16. One or more non-transitory computer-readable media encoding executable routines, wherein the routines, when executed by a processor, cause acts to be performed comprising:

determining projection data collected by a scan of an imaging object using a radiation source and a detector;

setting a plurality of first reconstruction planes in a body axis direction of the imaging object;

setting one or more second reconstruction planes different from the plurality of first reconstruction planes in the body axis direction of the imaging object, wherein the plurality of first reconstruction planes are located at different locations along the body axis direction from the one or more second reconstruction planes;

reconstructing a plurality of images corresponding to the plurality of first reconstruction planes and to be supplied to an operator and one or more images corresponding to the one or more second reconstruction planes, based on the projection data; and performing an artifact reduction process on an image corresponding to a given first reconstruction plane using at least some of the images corresponding to the plurality of first reconstruction planes and at least some of the images corresponding to the one or more second reconstruction planes, wherein performing the artifact reduction process on the image further comprises:

calculating a probability that a pixel in an image corresponding to the given first reconstruction plane represents an artifact based on pixel value variations in the one or more images corresponding to the plurality of reconstruction planes, the pixel value variations are variations in the body axis direction; and performing the artifact reduction process on the pixel based on the probability.

17. The image generating apparatus according to claim 1, wherein the artifact reduction process comprises a filtering process, the filtering process comprises a weighted addition process of the plurality of images, and the processor is configured to control a weighting factor of the weighted addition process based on the probability.

* * * * *